United States Patent [19]

Bellicardi et al.

[11] 4,313,571

[45] Feb. 2, 1982

[54] ELECTROMAGNETICALLY ACTUATED INJECTOR FOR INTERNAL COMBUSTION ENGINE

[75] Inventors: Francesco Bellicardi; Franco Molinari, both of Bologna, Italy

[73] Assignee: Weber S.p.A., Bologna, Italy

[21] Appl. No.: 105,989

[22] Filed: Dec. 21, 1979

[51] Int. Cl.³ .......................... B05B 1/32; F16K 31/02

[52] U.S. Cl. ..................................... 239/585; 251/139

[58] Field of Search ............... 239/585, 583, 584, 600, 239/533.3, 533.4, 533.5, 533.6, 533.7, 533.8, 533.9, 533.10, 533.11, 533.12; 251/139, 141, 129

[56] References Cited

U.S. PATENT DOCUMENTS

| | | | |
|---|---|---|---|
| 3,731,881 | 5/1973 | Dixon et al. | 239/585 |
| 4,007,880 | 2/1977 | Hans et al. | 239/585 |
| 4,231,525 | 11/1980 | Palma | 239/585 |

*Primary Examiner*—James B. Marbert

*Attorney, Agent, or Firm*—Birch, Stewart, Kolasch & Birch

[57] ABSTRACT

An electromagnetically actuated fuel injector is disclosed which includes an electrically wound core and a coaxial moving iron. A needle valve is secured to the iron to close an aperture provided in a bushing. The front surface of the core has an insulated thickening which serves to center the moving assembly and to limit opening travel.

6 Claims, 4 Drawing Figures

ELECTROMAGNETICALLY ACTUATED INJECTOR FOR INTERNAL COMBUSTION ENGINE

BACKGROUND OF THE INVENTION

1. Field of the Invention

The invention relates to an electromagnetic injection valve or injector, preferably but not exclusively for use in association with an electronic unit controlling the supply of fuel to an internal combustion engine. More specifically, the invention relates to an injector which, by means of an intermittent flow, determines the flow rate of fuel supplied to the engine, to ensure that the engine operates properly under all conditions.

2. Description of the Prior Art

Valves of the aforementioned kind have long been known. The main problems of existing valves are the following: the failure to obtain correct proportionality between the excitation frequency of the electromagnetic circuit and the flow rate of fuel delivered by the valve; the difficulty and high cost of constructing the components, which require narrow machining tolerances; and the further difficulty and high cost of assembling the components and installing them in the engine, owing to the dimensions of the injectors.

The object of the invention is to obviate the aforementioned disadvantages by eliminating the two components in existing injectors which are adapted to limit the opening travel of the valve. The first such component, usually a ring secured to the injector body, is traversed by the needle, whereas the second, which comprises a disc-shaped widened portion on the needle, has a diameter greater than the ring aperture. Contact between these two elements defines the end of opening travel, whereas the end of closing travel is defined by contact between a frusto-conical surface on the needle and the opening of the injector, as in the case also of injectors according to the invention.

It is necessary to add metallic material, usually very hard, to ensure that the injector has a long service life, in order to prevent direct contact between the moving iron and the magnetic core. This, however, increases the mass of material in reciprocation and thus increases the response times thereof to the alternating forces which act upon them. This adversely affect the proportional relation between the excitation frequency and the flow rate of injected fuel, as a result of perturbations which will be explained hereinafter.

In the device according to the invention, the masses in reciprocation do not have to bear operating components of the aforementioned kind. Therefore they can be smaller, thus reducing the response time. Another result is that the injector dimensions can be reduced, which is particularly important in single supply installation.

In addition, simplifications are made in the construction, thus reducing the number of tolerances and the cost manufacture.

SUMMARY OF THE INVENTION

All this is made possible by the invention, which comprises an internal magnetic core bearing an electric winding connected to a source of electric pulses, a moving iron member coaxial with the winding and with the core, and a needle valve secured to the moving iron and extending through an aperture formed in the injector body. Means are provided which are adapted to close the aperture. The invention is characterised in that the air gap between the body and the moving assembly comprising the moving iron and the needle valve is obtained by adding a controlled thickness of wear-resistant diamagnetic material, thus centring the moving assembly relative to the axis of symmetry of the injector and also limiting the opening travel, by reducing the effects of residual magnetism on the moving assembly.

BRIEF DESCRIPTION OF THE DRAWINGS

The aforementioned and other aims and advantages of the invention will be more clearly understood by reference to the accompanying drawings, which are given by way of non-limitative example of the scope of the invention. In the drawings.

DESCRIPTION OF THE PREFERRED EMBODIMENTS

Figure 1:
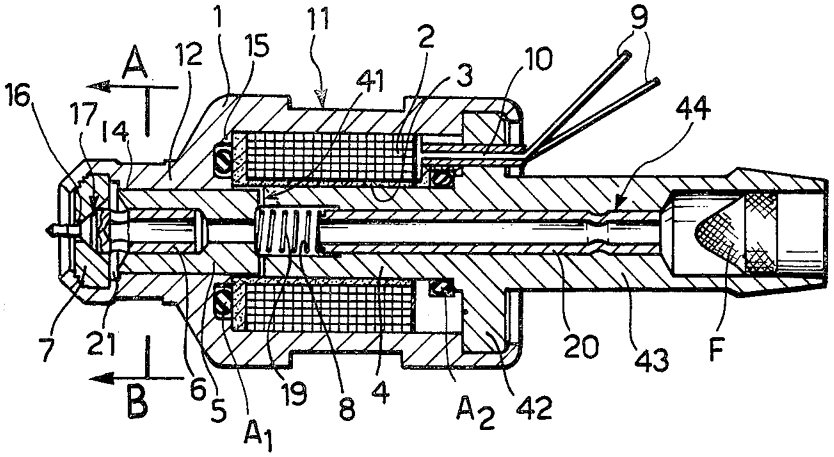
FIG. 1 shows a section along the axis of symmetry of an injector according to the invention.

As shown in FIG. 1, the injector according to the invention comprises some basic parts, each of which will be described in detail hereinafter.

The basic parts are the following: a body 1; a winding 2 in body 1 and secured by a holder 3; a core 4; a moving iron 5 secured to a needle 6, part of which extends through an aperture in a bushing 7; and a spring 8 which urges the moving iron 5 and needle 6 against the bushing 7. Body 1 is divided into two coaxial cylindrical parts 11, 12 made of soft magnetic iron, internally hollow and adjacent one another. The diameter of part 11 is greater than the diameter of part 12. Part 11 contains winding 2, which received current from two connections 9 connected to the electronic unit (not shown). Winding 2 is secured by an insulating holder 3. It surrounds core 4, which is also made of soft magnetic iron and is internally hollow and coaxial with body 1 and winding 2.

At the right, core 4 has a widened portion 42 which forms a shoulder for holder 3 and co-operates with shoulder 15 on body 11 to secure winding 2, holder 3, core 4 and body 1. Core 4 has an internal cylindrical cavity coaxial with the body of injector 1 and containing a tube 20. Core 4 follows the exterior of body 1 and takes the shape of a tube 43 connected to the fuel supply installation (not shown).

Tube 20 communicates at one end with the petrol pipe via a filter F, whereas the other end of tube 20 abuts the spring 8, whose second end presses on iron 5. A seam 44 prevents axial motion of tube 20 and is formed after the injector has been assembled.

Tube 20 is inserted into the central cavity of the injector by means of a predetermined load on spring 8, which is necessary for sealing the valve when winding 2 is not energized.

Holder 3 is made of insulating, magnetically permeable material and is in the form of a coil holding winding 2, which is electrically insulated from the body in a known manner. Two apertures 10 are formed in the right shoulder of holder 3 and connections 9 extend through them so as to supply current to winding 2.

All the electrical components are insulated in a known manner.

The second part of body 1 has an internal cavity 14, likewise cylindrical, and its axis of symmetry coincides with the axis of symmetry of the entire body.

The cavity 14 received the moving iron 5, which can move axially in reciprocation therein. The left end of the cylindrical part 12 contains a bushing 7, the central region of which is formed with an aperture 16 coaxial with the entire body 1.

Figure 4:
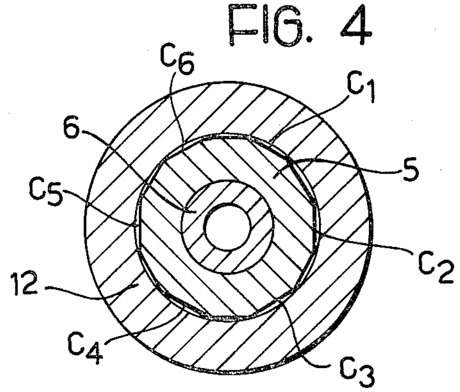
FIG. 4 is a section along plane A–B of FIG. 1.

The moving iron 5 is made of soft magnetic iron and is inside cavity 14. Its outer surface is prismatic, as shown in FIG. 4, which illustrates a section along plane A–B of the injector in FIG. 1. The section generates a polygonal shape which, in the example shown, has twelve sides, six of which are arcs of a circle and alternate with straight lines. In this manner, six ducts $C_1$, $C_2$, $C_3$, $C_4$, $C_5$ and $C_6$ are formed between the outer surface of the moving iron 5 and the inner surface of cavity 14 and communicate cavity 19 upstream of iron 5 to cavity 21 downstream of iron 5. Liquid can flow through these six ducts without experiencing pumping effects, when the injector is in action. Of course, the side surface of iron 5 can have different shapes from that illustrated provided they give the same anti-pumping effects and have cylindrical surface elements for contact with the surface of cavity 14. This configuration prevents the contact between the two surfaces being along sharp edges, and reduces the specific loads due to friction between the two bodies during the reciprocating motion of iron 5, and thus reduces the wear thereon.

Iron 5 has a cylindrical cavity 51 in which a needle 6 is positioned. An aperture 52 is formed at the right of the cavity and a widened frusto-conical portion is disposed at the left, thus facilitating the discharge of fuel from the needle 6. The outer surface of iron 5 is covered with added diamagnetic material of controlled thickness, thus providing the air gap required for reducing the effects of residual magnetism on the moving iron. The material is very hard, to reduce friction resulting from the motion of element 5 relative to cavity 14.

A controlled thickness of added insulating material is placed on the front surface 41 of core 4. The added material forms a wear-resistant layer, so that the surface in question can be a strong end-of-travel element limiting the opening motion of the moving iron 5. This insulating material prevents element 5, after coming in contact with the surface 41 of the core, from being held by attraction owing to the inevitable residual magnetism even when winding 2 is not energized. This has a twofold result. Firstly, the end of travel of opening is fixed without using any components in addition to those regulating the reciprocating motion of iron 5 in cavity 14. Secondly, an air gap equal to the thickness of the aforementioned added material is maintained between iron 5 and core 4 and has the same effect as a layer of fuel in conventional injectors, the dimensions of the layer depend on the manufacturing tolerances of the component in question. The consequence of the first result is that the mass of moving material can be decreased, since its lower limit is no longer affected by the presence of added elements. The consequence of the second result is a reduction in the number of tolerances and consequently in the cost of manufacture.

Figure 2:
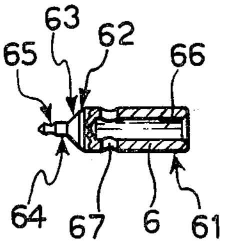
FIGS. 2 and 3 show constructional components of the injector according to FIG. 1.
Figure 3:
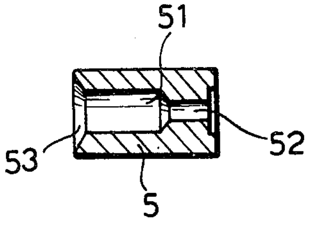

The needle 6, as illustrated in FIG. 2, is a cylindrical body made of steel having high surface hardness and adapted to fit into cavity 51 in iron 5. The needle also has two frusto-conical surfaces 62 and 63, the first surface being more conical than the second and the two surfaces meeting along a circle and connecting cylinder 61 to a cylinder 64 adapted to extend into aperture 16 in the bushing 7. Needle 6 terminates in a solid member of revolution 65 having a central cavity.

Part 61 of needle 6 has an aperture 66 coaxial with the needle and consequently with the entire injector and connects aperture 52 to the frusto-conical cavity 53 in iron 5, via a diametrical aperture 67.

During assembly, the cylindrical part 61 of needle 6 is inserted into the cavity 51 in iron 5 and, before the assembly process, an adhesive adapted to withstand the temperatures occurring in the induction manifold and the diluting effect of the fuel is interposed between members 61 and 5 in order to secure them together.

The bushing 7 is likewise made of steel having high surface hardness and is formed with an aperture 16 which is coaxial with the axis of symmetry of the injector and is connected to a frusto-conical aperture 17, widening towards cavity 21 in the injector. The frusto-conical aperture 17 co-operates with needle 6 in sealing the passage between chamber 21 and the exterior of the injector. When the circle generated by surfaces 62 and 63 bears on surface 17 under the action of spring 8, the passage is hermetically closed.

During the operation of the device, the fuel coming from the supply duct (not shown) travels through filter F, tube 20 enters cavity 18 containing spring 8 (and then the fuel) enters cavity 19 and thence enters cavity 21 and partly travels through ducts $C_1$, $C_2$, $C_3$, $C_4$, $C_5$ and $C_6$ and partly through apertures 66 and 67.

Sealing elements $A_1$ and $A_2$ are provided for preventing the fuel from entering the winding 2 or coming out of the injector through uncontrollable air-holes.

During operation of the engine, the winding 2 receives electric pulses from the unit (not shown) via connections 9. The number of pulses per unit time depends on the operating conditions of the engine and is the result of the action of an electronic station on the engine parameters.

Whenever winding 2 receives an electric pulse, a magnetic field is produced which attracts iron 5 towards the interior of core 4 against the action of spring 8. The iron moves quickly and stops against the layer of insulating material 41 disposed on the front surface of core 4.

In this manner, the surface comprising the two truncated cones 62, 63 of needle 6 moves away from aperture 17 of the bushing 7. The cylindrical stem 64 of member 61 remains inside aperture 16. This produces an annular passage through which fuel flows, and connects chamber 21 to the exterior of the injector. The shape of the passage and the presence and typical shape of stem 65 facilitate the spraying of fuel, which is discharged from the injector as a result of the internal pressure.

When current is not flowing through the winding 2, the magnetic field associated therewith tends to cancel out, and consequently the magnetic forces acting on iron 5 also tend to cancel out. Owing to the air gap adjacent the insulating material 41, the magnetic forces disappear almost instantaneously, or at any rate they immediately become incapable of opposing the action of spring 8 when it presses the moving iron in the opposite direction from that due to the force of the magnetic field. The thrust of spring 8 on iron 5 continues until the circle at the intersection of the two cones 62 and 63 of needle 6 rests on the frusto-conical surface 17 of the bushing 7. As a result of the load on spring 8 and the accurate machining of surfaces 62, 63 and 17, the fuel does not travel through the discharge aperture even though it is under pressure. Consequently, the fuel stops flowing until winding 2 is again energized.

The aforementioned alternative opening and closing of the annular aperture compressed between aperture 16 and the cylindrical stem 64, occurs at a frequency depending on the engine operating conditions and determines the flow rate of fuel injected into the suction pipe.

It is important to note that the flow rate of fuel during the time when iron 5 is in contact with the insulating layer 41 (hereinafter called the "stopping" time) depends on the pressure jump between the interior and the exterior of the injector, and on the shape of the annular passage. The amount of fuel injected during the stopping time can be considered as approximately proportional to the stopping time. On the other hand, during the short times when the annular aperture is being opened or closed, i.e. when the opening is displaced under the action of spring 8, the flow rate of fuel varies in a manner which cannot be expressed in simple mathematical terms.

The last-mentioned times, i.e. the response times of the moving system to magnetic and elastic stresses, must be as short as possible, to ensure the minimum deviation from a proportional relation between the injector flow rate and the excitation frequency. In order to reduce the aforementioned times to a minimum, the mass in motion must be reduced to a minimum, since this is the only way of ensuring that the accelerations to which it is subjected are at a maximum for a given applied force. The acceleration to which a body acted upon by a force is subjected is directly proportional to the force and inversely proportional to its mass, and the time taken by a body to travel through a given space varies inversely with the acceleration to which the body is subjected.

In the present invention, the response time to magnetic and elastic stresses, i.e. the travel time of iron 5, is very short, since acceleration becomes very high when the forces are applied to masses reduced to a minimum, owing to the elimination of those components which, in traditional injectors, co-operate to determine the end of travel during opening.

Experiments have shown that the linear relation between the operating cycles of the injector per unit time, i.e. frequency of the opening and closing movements of iron 5, is maintained within very satisfactory limits at the electric excitation frequencies occurring in vehicle engines.

This means that the reduction in moving mass results in a reduction in the opening and closing times. Consequently, since these times reduce the linearity of the flow rate, the effect of the stopping time predominates.

The preceding description relates to only one possible embodiment of the invention, the construction of which can be varied provided that its essence is not modified.

More particularly the added diamagnetic material can also be borne by the right surface of iron 5, provided contact between iron 5 and core 4 is via material of the aforementioned diamagnetic kind. The increase in mass due to a layer of diamagnetic material is negligible relative to the mass itself. The shape, dimensions and materials used do not limit the scope of the present invention.

What is claimed is:

1. An electromagnetically actuated injector for internal combustion engines comprising:

a hollow housing;

a magnetic core positioned within said housing and being operatively mounted adjacent an electric winding connected to a source of electric pulses;

a hollow extension coaxially projecting from one side of the housing;

an aperture at the free end of said extension;

a moving iron member slidably and axially mounted inside said hollow extension, coaxially with the winding and the core, and guided by the inner wall of the hollow extension, by means of contacting side surface zones;

said moving iron member and core having respective surfaces facing one another;

a needle valve secured to the moving iron member and extending through said aperture to open and close the aperture orifice;

added layers of wear-resistant diamagnetic material provided on (a) the side surface zones of the moving iron member which are slidably contacting the inner wall of said hollow extension, on (b) the surface of the moving iron member facing the core and on (c) the surface of the core facing the moving iron member, said layers having a respective predetermined controlled thickness to center the moving iron member and the needle valves secured thereto relative to the longitudinal axis of said hollow extension and to limit the axial distance between the aperture orifice and core, whereby the effects of residual magnetism on the moving iron member and needle valve are reduced.

2. An electromagentically actuated injector according to claim 1, wherein said side surface zones of the moving iron member provided with an added layer of diamagnetic material and slidably contacting the inner wall of said hollow extension, are cylindrical and alternating with flat zones.

3. An electromagentically actuated injector according to claim 1 or 2, wherein said needle valve is secured to the moving iron member into a cylindrical axial cavity thereof by means of an adhesive.

4. An electrically actuated injector according to claim 1, wherein said cylindrical axial cavity of the moving iron member is provided with a widened portion at the open side facing the aperture orifice.

5. An injector according to claim 1, wherein the moving iron has a prismatic side surface, the generating polygon of which comprises arcs of a circle alternating with straight lines and is disposed in a cylindrical cavity formed in the injector body.

6. An injector according to claim 1, wherein the moving iron has an internal cavity adapted to receive one end of the needle, and an adhesive adapted to withstand the temperatures in the suction manifold and dilution by the fuel is disposed between the two members in order to secure them together.

* * * * *